(12) United States Patent
Rogers et al.

(10) Patent No.: US 7,961,195 B1
(45) Date of Patent: *Jun. 14, 2011

(54) TWO COMPONENT TEXTURE MAP COMPRESSION

(75) Inventors: Douglas H. Rogers, Gilroy, CA (US);
Gary C. King, San Jose, CA (US);
Walter E. Donovan, Saratoga, CA (US)

(73) Assignee: Nvidia Corporation, Santa Clara, CA (US)

( * ) Notice: Subject to any disclaimer, the term of this patent is extended or adjusted under 35 U.S.C. 154(b) by 837 days.

This patent is subject to a terminal disclaimer.

(21) Appl. No.: 10/990,900

(22) Filed: Nov. 16, 2004

(51) Int. Cl.
*G06T 9/00* (2006.01)
*G06F 15/00* (2006.01)
*G06T 1/00* (2006.01)

(52) U.S. Cl. ........................................ 345/555; 345/501

(58) Field of Classification Search .................. 345/555, 345/582; 382/162, 254; 708/655
See application file for complete search history.

(56) References Cited

U.S. PATENT DOCUMENTS

| | | |
|---|---|---|
| 4,791,403 A | 12/1988 | Mitchell et al. |
| 4,803,477 A | 2/1989 | Miyatake et al. |
| 5,109,417 A | 4/1992 | Fielder et al. |
| 5,227,789 A * | 7/1993 | Barry et al. ..................... 341/65 |
| 5,495,542 A * | 2/1996 | Shimomura et al. .......... 382/254 |
| 5,644,524 A | 7/1997 | Van Aken et al. |
| 5,736,987 A | 4/1998 | Drucker et al. |
| 5,793,371 A | 8/1998 | Deering |
| 5,801,975 A | 9/1998 | Thayer et al. |
| 5,831,640 A | 11/1998 | Wang et al. |
| 5,835,097 A | 11/1998 | Vaswani et al. |
| 5,841,442 A | 11/1998 | Einkauf et al. |
| 5,963,744 A | 10/1999 | Slavenburg et al. |
| 6,052,127 A | 4/2000 | Vaswani et al. |
| 6,055,000 A * | 4/2000 | Okada ........................... 345/536 |
| 6,078,334 A | 6/2000 | Hanaoka et al. |
| 6,184,893 B1 | 2/2001 | Devic et al. |
| 6,501,851 B1 * | 12/2002 | Kondo et al. .................. 382/162 |
| 6,546,409 B1 * | 4/2003 | Wong ............................ 708/655 |
| 6,580,828 B1 | 6/2003 | Li |
| 6,876,362 B1 | 4/2005 | Newhall, Jr. et al. |
| 7,109,999 B1 | 9/2006 | Lindholm et al. |
| 7,224,838 B2 * | 5/2007 | Kondo et al. .................. 382/232 |
| 2002/0147753 A1 | 10/2002 | Rao et al. |
| 2003/0023646 A1 | 1/2003 | Lin et al. |
| 2003/0105788 A1 | 6/2003 | Chatterjee |
| 2003/0206177 A1 * | 11/2003 | Hoppe et al. ................... 345/582 |
| 2003/0223490 A1 * | 12/2003 | Kondo et al. .................. 375/240 |
| 2004/0151372 A1 * | 8/2004 | Reshetov et al. .............. 382/166 |
| 2004/0207631 A1 | 10/2004 | Fenney et al. |
| 2005/0110790 A1 | 5/2005 | D'Amora |

OTHER PUBLICATIONS

Mark Adler, Gzappend, Nov. 4, 2003, http://svn.ghostscript.com/ghostscript/tags/zlib-1.2.3/examples/gzappend.c.

* cited by examiner

*Primary Examiner* — Kee M Tung
*Assistant Examiner* — Jacinta Crawford (57) ABSTRACT

Methods and systems for compressing and decompressing data are described. A first value of N+1 bits and a second value of N+1 bits are reduced to strings of N bits each. The first and second strings of N bits are stored in a particular order relative to one another in a compression block. The particular order in which the first and second strings of N bits are stored in the compression block is used to derive a bit value that is then used in combination with one of the strings of N bits to reconstruct that string as N+1 bits.

37 Claims, 5 Drawing Sheets

90
92
READ A VALUE IN A COMPRESSION BLOCK

94
USE THAT VALUE TO IDENTIFY A TYPE OF FORMAT USED TO STORE THE DATA IN THE COMPRESSION BLOCK AND HENCE TO IDENTIFY THE COMPRESSION SCHEME

TWO COMPONENT TEXTURE MAP COMPRESSION

RELATED UNITED STATES PATENT APPLICATIONS

This application is related to U.S. patent application Ser. No. 10/990,884 by D. Rogers et al., filed on Nov. 16, 2004, entitled "Data Decompression with Extra Precision," with assigned to the assignee of the present invention, and hereby incorporated by reference in its entirety.

FIELD OF THE INVENTION

Embodiments of the present invention generally relate to data compression and decompression, in particular data used in connection with computer graphics.

BACKGROUND ART

As a result of continuing advances in computer graphics, images that look more and more realistic are being rendered in applications such as video games. A key to achieving a convincing image is the ability to realistically simulate lighting and shadowing effects on a textured (e.g., three-dimensional) surface.

One technique for rendering surface textures involves the use of normal maps. When rendering using normal maps, each point on a surface to be rendered is associated with a unit length vector that is perpendicular to that point. The normal vector indicates the direction that the surface is facing at that point. Using a normal map, contemporary graphics engines can render very complex looking surfaces to achieve a more realistic effect.

A normal map can contain a large quantity of data, especially when realistic-looking surfaces at high screen (display) resolutions are being portrayed. Compression schemes are usually employed to reduce the amount of data. However, conventional real-time compression techniques can result in a loss of precision when the data are reconstructed, leading to reduced image quality.

SUMMARY OF THE INVENTION

Accordingly, a system and/or method that can reconstruct normals with improved precision would be advantageous. Embodiments in accordance with the present invention provide this and other advantages. In one embodiment, the data to be compressed and decompressed is related to data of a normal map used in connection with computer graphics systems.

In one embodiment of the present invention, a first value of N+1 bits and a second value of N+1 bits are reduced to strings of N bits each. The first and second N-bit strings are stored in a particular order relative to one another in a compression block. The particular order in which the first and second N-bit strings are stored in the compression block is used to derive a bit value that is then used in combination with one of the N-bit strings to reconstruct that string as N+1 bits. In one such embodiment, the bit value is appended to the N-bit string that has a magnitude that is smaller than that of the other N-bit string.

In one embodiment, the first and second values are nine (9) bits in length (that is, N+1 is 9), and the first and second strings of N bits are signed values normalized to the range of [−1, 1] coded in eight (8) bits each (e.g., one byte), the 8 bits having a value in the range of [−127, 127]. In another embodiment, a byte value of [−128] is used to indicate that a compression scheme different from that described above is being used.

The first value and the second value represent the endpoints of a range of intermediate data values. In one embodiment, the intermediate data values are compressed by indexing them to a set of data values that are interpolated from the first and second values. In such an embodiment, each intermediate data value is replaced in the compression block with a bit code that serves as an index to the set of interpolated values.

In one embodiment, the data being compressed and reconstructed are associated with a normal map used in connection with computer graphics systems. In such an embodiment, the first and second values of N+1 bits (and the first and second strings of N bits) correspond to one dimension (e.g., the x-component) of a normal vector. A second dimension of the normal vector (e.g., the y-component) can be compressed and reconstructed in the same manner as the x-component. The third dimension (e.g., the z-component) of the normal vector can be derived from the x-component and the y-component.

In another embodiment, the data being compressed include spherical harmonic data consisting of multiple components or dimensions. Each component of the spherical harmonic data can be compressed by treating it in a manner similar to that described above.

In summary, embodiments of the present invention provide methods and systems for compressing and reconstructing data with improved precision. As a result, the quality of rendered images can be increased. The improvement in precision is achieved without actually storing an extra precision bit. In effect, the extra precision bit is a "virtual" bit that is not stored in the compression block, but whose value is derived from other information that is stored. Thus, improved precision is achieved without significantly increasing the burden on computational resources and without increasing the size or changing the structure of the compression block. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

The drawings referred to in the description should not be understood as being drawn to scale except if specifically noted.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reducing," "storing," "using," "compressing," "decompressing," "restoring," "determining," "constructing," "accessing," "calculating," "indexing," "associating," "truncating," "appending" or the like, refer to actions and processes (e.g., flowcharts 70 and 90 of FIGS. 7 and 9, respectively) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

Figure 1:
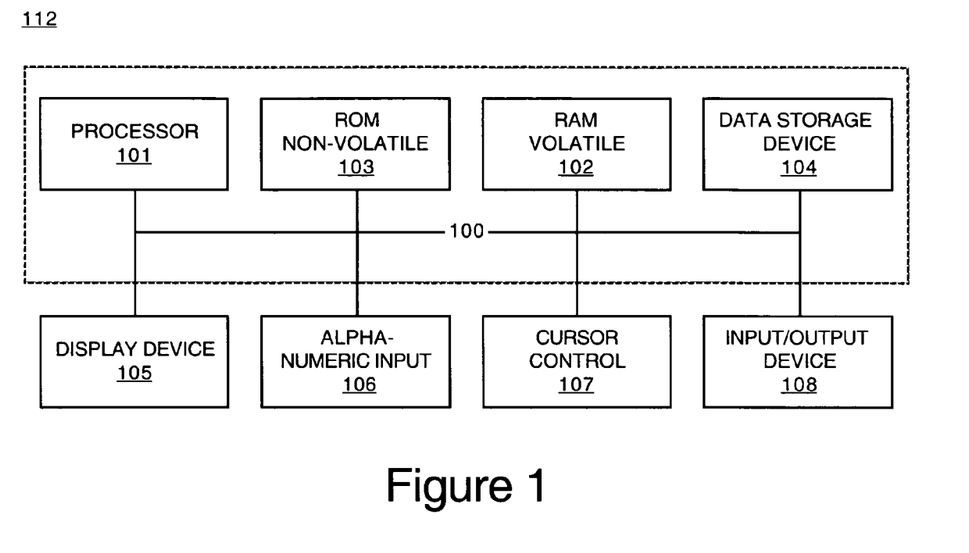
FIG. 1 is a block diagram of an exemplary computer system upon which embodiments of the present invention can be implemented.

FIG. 1 is a block diagram of an exemplary computer system 112 upon which embodiments of the present invention can be implemented. Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 also includes a display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes a cursor control or directing device 107 coupled to bus 100 for communicating user input information and command selections to central processor 101. Computer system 112 also includes signal communication interface (input/output device) 108, which is also coupled to bus 100. Communication interface 108 can also include wireless communication mechanisms.

It is appreciated that computer system 112 described herein illustrates an exemplary configuration of an operational platform. Nevertheless, other computer systems with differing configurations can also be used in place of computer system 112 within the scope of the present invention. These other types of computer systems can include workstations and thin client devices that are coupled to other computer systems in a distributed computer system network. Computer system 112 may be any type of computing device, such as but not limited to a personal computer, a game console, a personal digital assistant, a cell phone, a portable digital device, etc.

Figure 2:
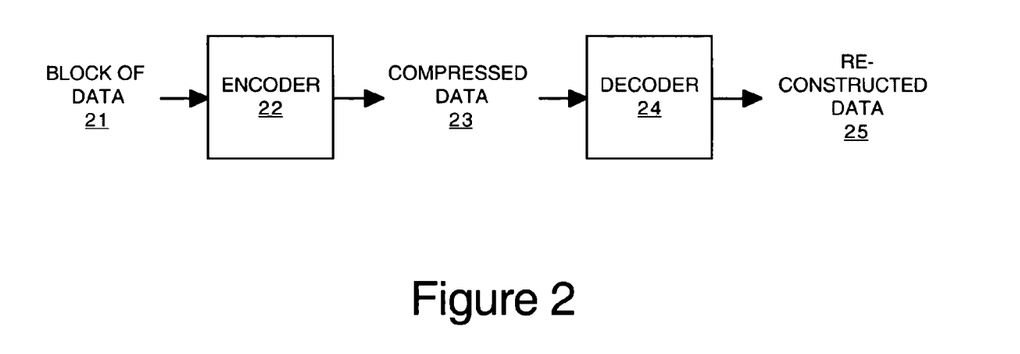
FIG. 2 is a block diagram showing the flow of data into and out of a data encoder according to one embodiment of the present invention.

FIG. 2 is a block diagram showing the flow of data into and out of a data encoder or compressor 22 according to one embodiment of the present invention. In the example of FIG. 2, data 21 corresponds to data for a normal map that is associated with a block of texels (for example, a 4×4 block of texels). In a normal map, a three-dimensional normal vector is associated with each of the texels. Encoder 22 compresses the data 21 using an encoding scheme that is described more fully in conjunction with FIGS. 3 and 4. In overview, encoder 22 selects anchor points or endpoints that bound the range of values of the data 21. The anchor points are used to generate a palette (e.g., a lookup table) containing values that lie between the anchor points. A unique index or bit code is associated with each of the anchor points and with each of the intermediate values. The bit codes can be used to encode each of the values in data 21 to generate the compressed data 23. In essence, each of the values in data 21 is replaced with a bit code that is shorter in length. For example, integer values zero (0) through seven (7), a total of eight values, can be encoded as a bit code that is three bits in length. Thus, compressed data 23 uses fewer bits than are included in data 21 to represent the components of the normal vectors in the normal map.

Decoder 24 of FIG. 2 decompresses (reconstructs) the compressed data 23 to generate the reconstructed data 25. In general, the anchor points are used to reconstruct the palette. The palette is used with the encoded bit codes to construct a decompressed version of the original data. Additional information is provided in conjunction with Tables 3 and 4.

Figure 3:
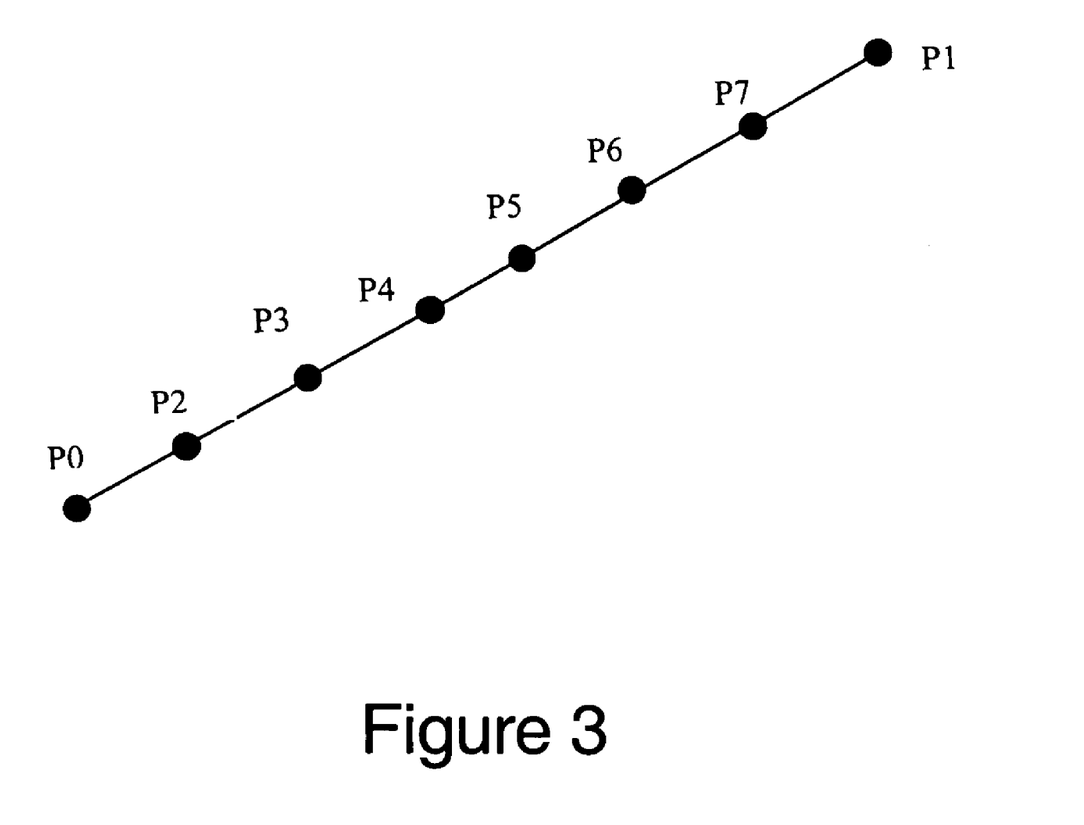
FIG. 3 illustrates a palette that includes anchor endpoints and other points derived from the endpoints according to one embodiment of the present invention.

FIG. 3 illustrates a palette that includes anchor endpoints and other points derived from the endpoints according to one embodiment of the present invention. The use of a palette for encoding data is described further in conjunction with FIG. 4 below.

With reference to FIG. 3, in the present embodiment, two anchor points (P0 and P1) are defined. The remaining points P2 through P7 are derived using percentages of P0 and P1.

In general, the points P0 and P1 are each represented using N+1 bits and encoded using N bits. In one embodiment, the points P0 and P1 are each represented using nine (9) bits and encoded (compressed) using eight (8) bits each. In one embodiment, this is accomplished by truncating the least significant bit from each of P0 and P1.

In the present embodiment, six other points (P2, P3, P4, P5, P6 and P7) are linearly interpolated using P0 and P1, yielding a total of eight values for the palette. Each of the points P0 through P7 is associated with a unique bit code (refer to the discussion of FIG. 4 below).

Table 1 provides one example of code that can be used to generate a palette according to one embodiment of the present invention.

TABLE 1

Exemplary Code for Generating a Palette

```
P0 =                           // bit code 000
P1 =                           // bit code 001
P2 = (6 * P0 + 1 * P1 + 3)/7;  // bit code 010
P3 = (5 * P0 + 2 * P1 + 3)/7;  // bit code 011
P4 = (4 * P0 + 3 * P1 + 3)/7;  // bit code 100
P5 = (3 * P0 + 4 * P1 + 3)/7;  // bit code 101
P6 = (2 * P0 + 5 * P1 + 3)/7;  // bit code 110
P7 = (1 * P0 + 6 * P1 + 3)/7;  // bit code 111
}
```

According to the various embodiments of the present invention, P0 and P1 are either signed values or unsigned values. Signed values are normalized to the range [−1, 1] and the interpolation scheme described above (Table 1) is used, except the values for P0 and P1 are signed and the results are not clamped to integer values.

The present invention will be described for an embodiment in which the data to be compressed (encoded) are associated with a texture map, specifically a normal map. In such an embodiment, the interpolation scheme described above can be applied to both the x-component and the y-component of a normal vector. Because a normal vector has unit length and is perpendicular to a respective surface, the z-component can be derived from the x-component and the y-component as follows:

$$z=\operatorname{sqrt}(\max(1-x^2-y^2,0)). \qquad (1)$$

Although described in the context of two-component normal map compression (with the third component of the normal map derived from those two components), embodiments in accordance with the present invention are not so limited. Embodiments of the present invention can also be applied to other types of multiple-element, unconstrained or arbitrary data such as spherical harmonic data, by applying multiples of the elements of the compression/decompression scheme described herein (that is, by applying the scheme described herein to each element in the multiple-element data).

Figure 4:
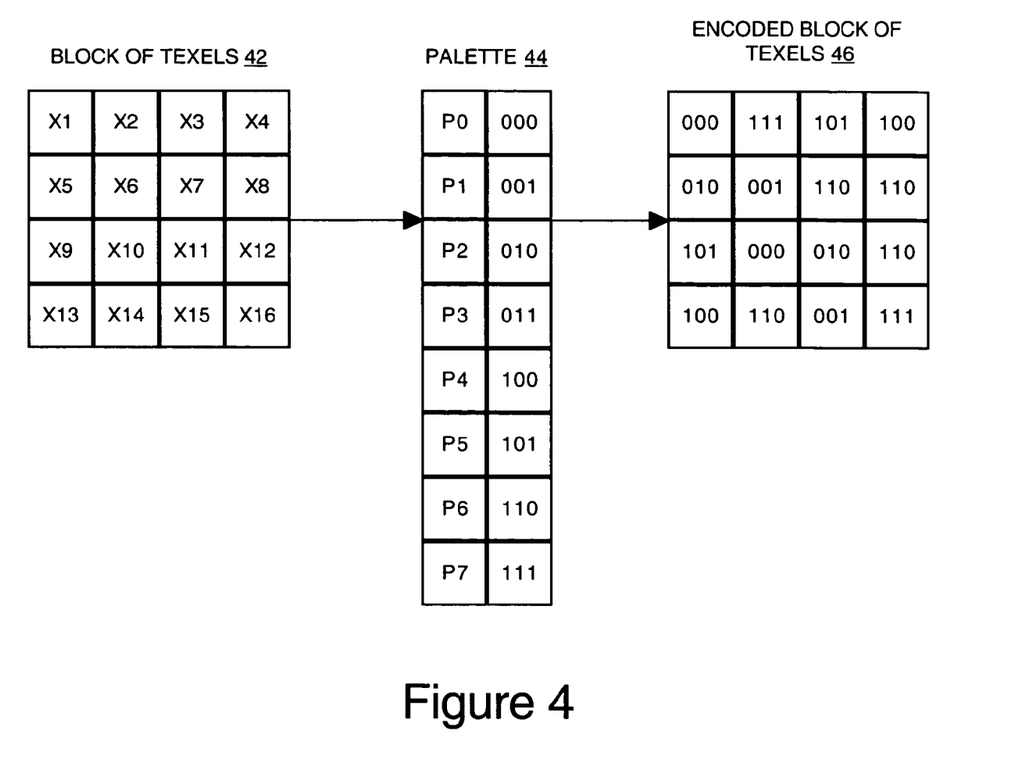
FIG. 4 is a data flow diagram showing a manner in which a palette can be used to encode data according to one embodiment of the present invention.

FIG. 4 illustrates how a palette 44 can be used to encode data according to one embodiment of the present invention. Palette 44 is a memory-resident data structure and includes the anchor points P0 and P1 and the intermediate range of values P2 through P7 that were interpolated using P0 and P1. Each of the values P0 through P7 is indexed by a respective and unique bit code. In the present embodiment, the bit code uses three (3) bits.

In the example of FIG. 4, the x-component (X1, X2, . . . , X15, X16) of the normal vector associated with each texel in a memory-resident block of texels 42 is to be encoded. The x-component example can be extended readily to the y-components of the normal vectors. Also, although the block of texels 42 includes 16 texels, the present invention is not so limited.

In the present embodiment, during the compression phase, the x-component values X1 through X16 are each compared to the values P0 through P7, in order to determine which of the values in the palette 44 each x-component value is closest to. For instance, if the value X1 is compared to the values P0 through P7 and found to be closest to the value P0, then bit code 000 would be associated with X1. Similarly, if X5 is found to be closest to P2, then bit code 010 would be associated with X5. In general, each of the data values in the block of texels 42 is associated with a bit code selected from palette 44. As a result, a memory-resident encoded block of texels 46 includes an exemplary bit code or index for each of the values in block of texels 42.

Figure 5:
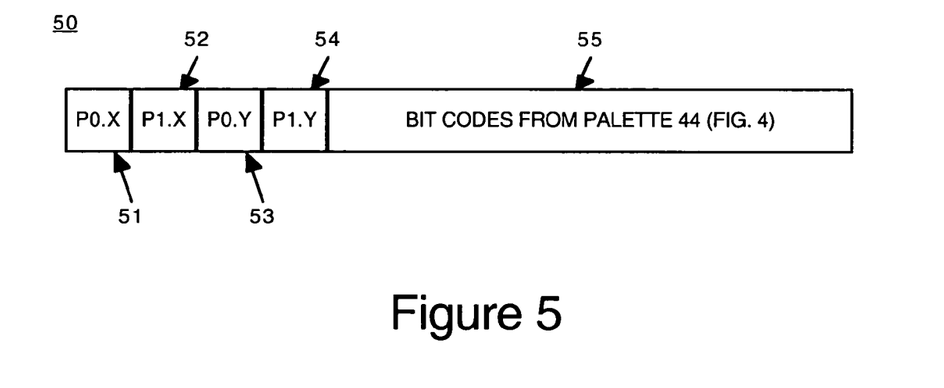
FIG. 5 illustrates a memory-resident block of compressed data according to one embodiment of the present invention.

FIG. 5 illustrates a memory-resident compression block 50 containing encoded data according to one embodiment of the present invention. The values of P0 and P1 associated with the x-component of a memory-resident normal map are referred to as P0.x and P1.x, respectively. Similarly, the values of P0 and P1 associated with the y-component of a memory-resident normal map are referred to as P0.y and P1.y, respectively.

In the example of FIG. 5, compression block 50 includes a first portion 51 for holding or storing a first encoded value (the encoded value of either P0.x or P1.x), a second portion 52 for holding or storing a second encoded value (the encoded value of either P0.x or P1.x), a third portion 53 for holding or storing a third value (the encoded value of either P0.y or P1.y), and a fourth portion 54 for holding or storing a fourth value (the encoded value of either P0.y or P1.y). Compression block 50 also includes a portion 55 for holding or storing selected bit codes (e.g., the bit codes selected from palette 44 of FIG. 4).

As will be seen, the particular order in which values are placed in portions 51 and 52 plays a significant role in reconstructing the values of P0.x and P1.x from the encoded values. Likewise, the particular order in which values are placed in portions 53 and 54 plays a significant role in reconstructing the values of P0.y and P1.y from the encoded values. Although FIG. 5 shows P0.x in portion 51, P1.x in portion 52, P0.y in portion 53 and P1.y in portion 54, this is only one example of an order in which those values may be stored in compression block 50. That is, as will be seen, P1.x can precede P0.x in compression block 50, and P1.y can precede P0.y. The relative order of P0.x and P1.x is independent of the relative order of P0.y and P1.y, and vice versa.

Figure 6:
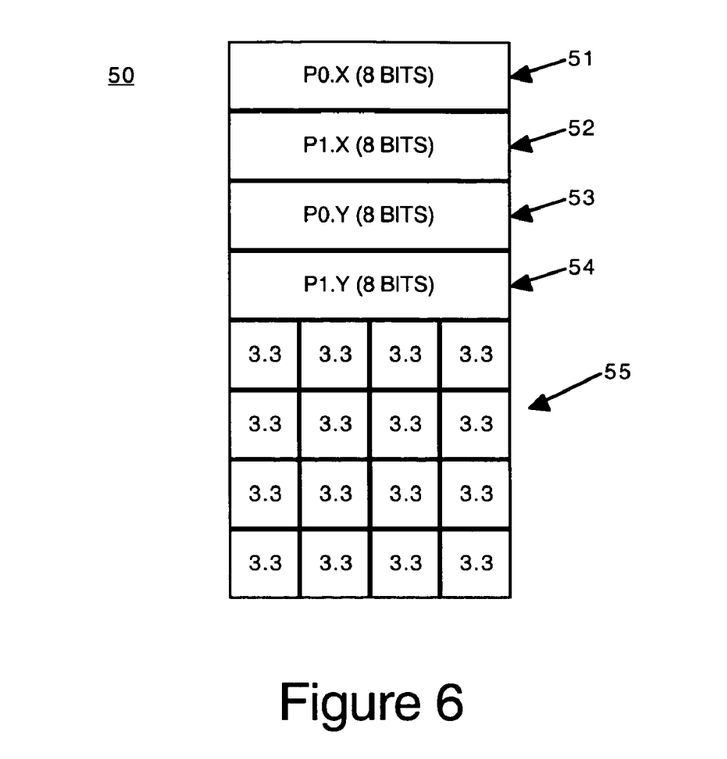
FIG. 6 also illustrates a memory-resident block of compressed data according to one embodiment of the present invention.

FIG. 6 further illustrates memory-resident compression block 50 according to one embodiment of the present invention. As can be seen, portion 55 actually includes a plurality of portions, each portion holding or storing a bit code for each x-component and a bit code for each y-component in the block of texels 42 (FIG. 4).

In one embodiment, each of the portions in portion 55 is 3 bits in length. In FIG. 6, "3.3" represents six (6) bits; 3 bits for each x-component bit code and 3 bits for each y-component bit code. In one embodiment, the portions 51, 52, 53 and 54 are each 8 bits in length. Thus, in one embodiment, compression block 50 has a length of 128 bits.

As mentioned above, in one embodiment, the points P0.x, P1.x, P0.y and P1.y are each represented using 9 bits before they are encoded as 8-bit strings. In other words, in general, P0.x, P1.x, P0.y and P1.y are each reduced from N+1 bits to N bits before they are stored in compression block 50. In one embodiment, this is accomplished by truncating the least significant bit from each of P0.x, P1.x, P0.y and P1.y.

According to embodiments of the present invention, the magnitudes of P0.x and P1.x are compared, and the values of the least significant bits of P0.x and P1.x are determined. The relative magnitudes of P0.x and P1.x, and the respective values of their least significant bits, are used to determine the order in which the encoded values of P0.x and P1.x are stored in compression block 50. The order in which the encoded values of P0.x and P1.x are stored in compression block 50 is used to derive a bit value that can then be appended to the encoded value of either P0.x or P1.x. In one embodiment, the derived bit value is appended to the encoded value of P0.x or P1.x that has the smaller magnitude relative to the other value.

Table 2 provides one example of code that can be used to determine the order for storing the encoded values of P0.x and P1.x in compression block 50 of FIGS. 5 and 6. The order for storing the encoded values of P0.y and P1.y is determined in a similar manner.

TABLE 2

Exemplary Code for Ordering Anchor
Points in a Compression Block

```
if (abs(P0.x) < abs(P1.x))
{
    if (lsb(P0.x) == 0)
        store P0.x before P1.x    // indicate lsb P0.x = 0
    else
        store P1.x before P0.x    // indicate lsb P0.x = 1
}
else
{
    if (lsb(P1.x) == 0)
        store P0.x before P1.x    // indicate lsb P1.x = 0
    else
        store P1.x before P0.x    // indicate lsb P1.x = 1
}
```

In Table 2, "abs" refers to absolute value, and "lsb" refers to the least significant bit.

There can be two flavors of decompression, signed and unsigned. Note that P0 is the first 8 bits of the compressed block and P1 the next 8 bits of the block. 1-, 2-, 3- or 4-component compressed format can be used. The same decompression routine is used on each component.

Table 3 provides one example of code used for unsigned decompression that can be used to derive the value of the extra precision bit that can then appended to the encoded value of either P0 or P1. As mentioned, in one embodiment, the derived bit value is appended to the encoded value that has the smaller magnitude.

TABLE 3

Exemplary Code for Unsigned Decompression

```
if (P0 <= P1)    // this is an unsigned compare on 2 8 bit values
{
    P0_9bits = P0 << 1;
    P1_9bits = (P1 << 1) | (P1 >> 7);    // this implements out = floor (in * 511.0/255.0 + 0.5)
}
else
{
```

TABLE 3-continued

Exemplary Code for Unsigned Decompression

```
    P0_9bits = (P0 << 1) | (P0 >> 7);
    P1_9bits = (P1 << 1) | 1;
}
```

Scaling by 511/255 is being done so that 8 bits are scaled to 9 bits such that values in the range [0 . . . 255] map as evenly as possible to the range [0 . . . 512]. Similarly, for signed values, the signed range [−127 . . . 127] is mapped as evenly as possible to the signed range [−255 . . . 255], as described below.

Table 4 provides one example of code used for signed decompression that can be used to derive the value of the extra precision bit that can then appended to the encoded value of either P0 or P1. As mentioned, in one embodiment, the derived bit value is appended to the encoded value that has the smaller magnitude.

TABLE 4

Exemplary Code for Signed Decompression

```
if (abs(P0) <= abs(P1))    // this is an unsigned compare of two 8
bit values that are absolute values of numbers in −128 . . . 127 range
{
    P0_9bits = P0 << 1;
    P1_9bits = signed_scale(P1);    // this implements out =
(in == −128) ? −256 : floor (in * 255.0/127.0 + 0.5)
}
else
{
    P0_9bits = signed_scale(P0);
    P1_9bits = (P1 << 1) | 1;
}
```

The function "signed_scale" takes an 8-bit two's complement value and returns a 9-bit two's complement value. Note that for signed values, only the range −127 . . . 127 is supported (representing −1.0 . . . 1.0) for P0 and P1. The value −128 for P0 or P1 in the signed case is presently a reserved value. Consequently, the value [−128] (0x80) is therefore available for some type of alternate use. In one embodiment, the value [−128] is used to identify the use of a compression scheme that is different from the compression scheme described above. This is discussed further in conjunction with FIGS. 8 and 9 below.

In both Tables 3 and 4, the "_9 bits" values are used in the interpolation to compute the palette values. Table 5 provides one example of code that can be used to reconstruct 9 bit signed values, two of which are then used to construct a palette.

TABLE 5

Exemplary Code for Reconstructing a Palette

```
S009 signed_scale(S008 i)
{
    S009 out;
    if (i == −128)
        out = −256;
    else if (i <= −64)
        out = (i << 1) − 1;
    else if (i <= −1)
        out = ((i << 1) | 1) − 1;
    else if (i < 64)
        out = (i << 1);
    else
        out = (i << 1) | 1;
```

TABLE 5-continued

Exemplary Code for Reconstructing a Palette

```
    return out;
}
```

Figure 7:
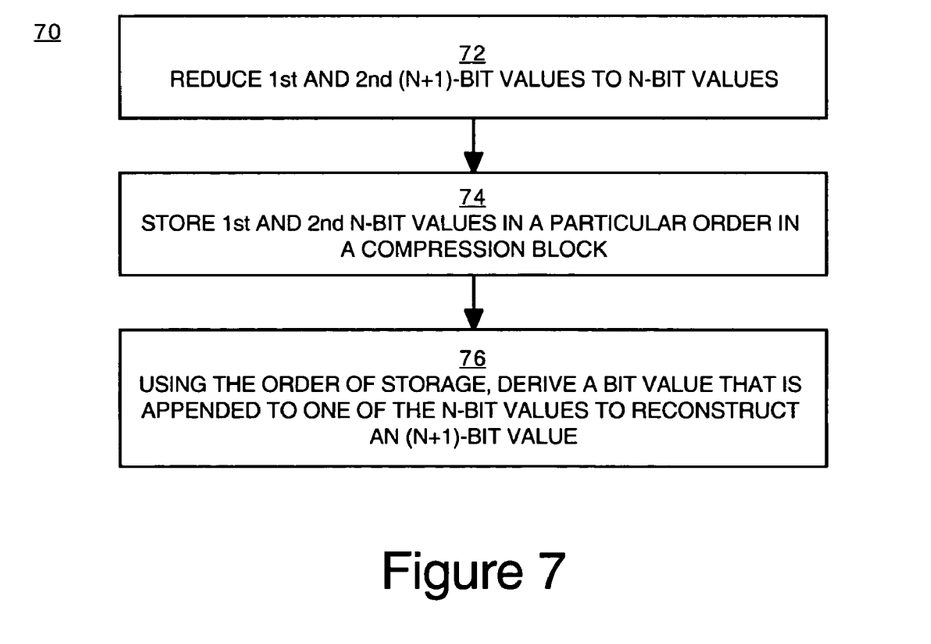
FIG. 7 is a flowchart of an exemplary computer-implemented method for compressing and decompressing data in accordance with one embodiment of the present invention.

FIG. 7 is a flowchart 70 of a computer-implemented method for compressing and decompressing data in accordance with one embodiment of the present invention. Although specific steps are disclosed in flowchart 70, such steps are exemplary. That is, the present invention is well suited to performing various other steps or variations of the steps recited in flowchart 70. It is appreciated that the steps in flowchart 70 may be performed in an order different than presented and that the steps in flowchart 70 are not necessarily performed in the sequence illustrated. In one embodiment, flowchart 70 is implemented as program instructions stored in computer-readable memory units of computer system 112 and executed by processor 101 (FIG. 1).

In step 72 of FIG. 7, in the present embodiment, a first value comprising N+1 bits and a second value comprising N+1 bits are reduced to respective first and second strings of N bits each. In one embodiment, the first and second values are nine (9) bits in length (that is, N+1 is 9), and the first and second strings of N bits are signed values normalized to the range of [−1, 1] coded in eight (8) bits each, the 8 bits having a value in the range of [−127, 127].

In step 74, the first and second strings of N bits are stored in a particular order relative to one another in a compression block. In one embodiment, the relative magnitude of the first and second N+1-bit values is determined. Also, the values of the least significant bits of the first and second N+1-bit values are determined. Then, the values of the least significant bits and the relative magnitude of the first and second N+1-bit values are used to determine the order for storing the first and second strings of N bits in the compression block.

In step 76, the particular order in which the first and second strings of N bits are stored in the compression block is used to derive a bit value that is then used in combination with one of the first and second strings of N bits to restore that string to N+1 bits. In one embodiment, a determination is made regarding which of the first and second strings of N bits in the compression block has the smaller magnitude, and the first bit value is appended to the string that has the smaller magnitude.

Figure 8:
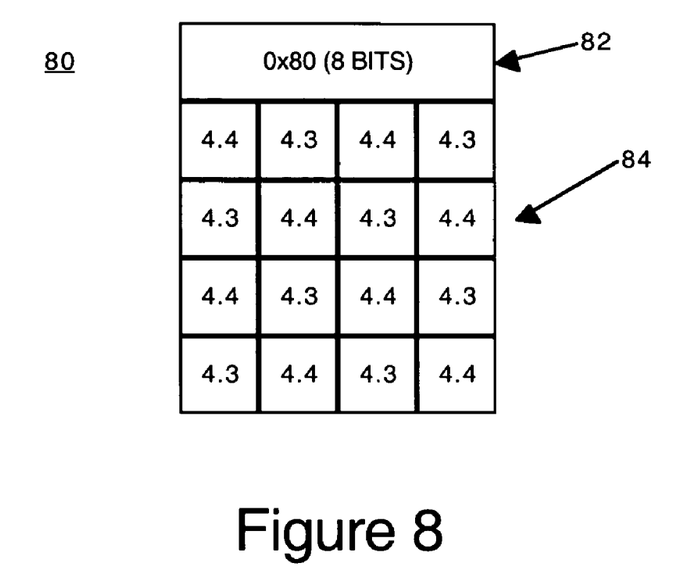
FIG. 8 illustrates a second embodiment of a block of compressed data according to the present invention.

FIG. 8 illustrates a memory-resident compression block 80 that contains encoded data according to an embodiment of the present invention in which a compression scheme different from that described above is used. Like compression block 50 of FIGS. 5 and 6, compression block 80 has a length of 128 bits. In the example of FIG. 8, compression block 80 includes a portion 82 for storing or holding an 8-bit value and a plurality of other portions 84 for storing or holding encoded x-components and y-components associated with a memory-resident normal map.

In the present embodiment, if the first 8 bits of a compression block represent [−128] (0x80), then encoded values for the x-components and y-components of a normal map are stored directly in the other 120 bits of the compression block. In the example of FIG. 8, 15 bits are used for every two texels in a block of 16 texels. In FIG. 8, "4.3" indicates that four (4) bits are being used to encode an x-component and 3 bits are being used to encode a y-component, and "3.4" indicates the opposite. Similarly, "4.4" indicates that 4 bits are being used to encode an x-component and 4 bits are being used to encode a y-component.

As can be seen from FIGS. 6 and 8, the type of compression scheme can influence the format for storing encoded data in the compression block. However, both compression block 50 of FIG. 6 and compression block 80 of FIG. 8 have a first portion that is 8 bits in length (portions 51 and 82, respectively). By reading the 8-bit value in the first portion of a compression block, it can be determined which compression scheme is in use, and hence the format of the encoded data in the compression block can be deduced.

Figure 9:
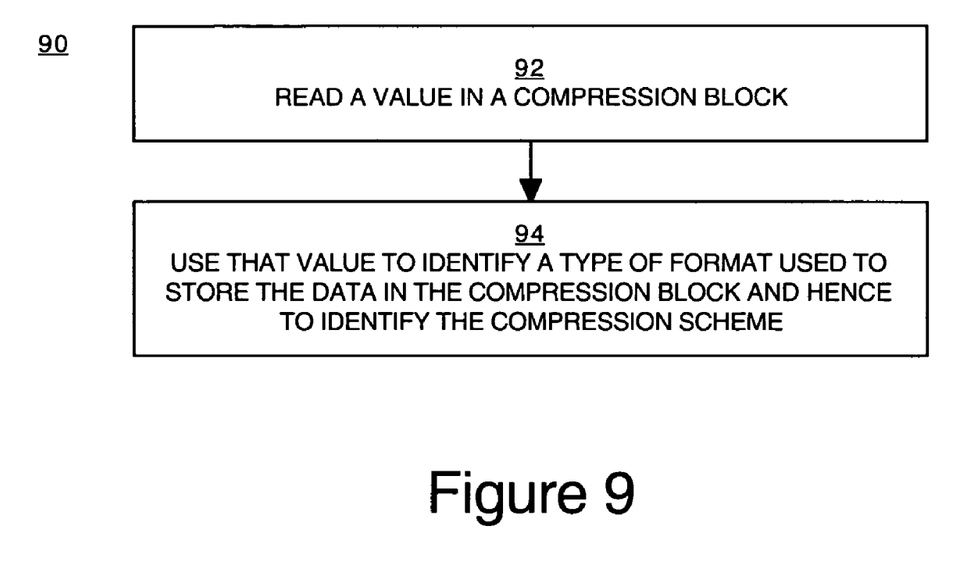
FIG. 9 is a flowchart of an exemplary computer-implemented method for compressing and decompressing data using different compression schemes in accordance with one embodiment of the present invention.

FIG. 9 is a flowchart 90 of a computer-implemented method for compressing and decompressing data using different compression schemes in accordance with one embodiment of the present invention. Although specific steps are disclosed in flowchart 90, such steps are exemplary. That is, the present invention is well suited to performing various other steps or variations of the steps recited in flowchart 90. It is appreciated that the steps in flowchart 90 may be performed in an order different than presented and that the steps in flowchart 90 are not necessarily performed in the sequence illustrated. In one embodiment, flowchart 90 is implemented as program instructions stored in computer-readable memory units of computer system 112 and executed by processor 101 (FIG. 1).

In step 92 of FIG. 9, in the present embodiment, a value (e.g., the first byte) in a compression block is read. The first value is a signed value having N bits and normalized to the range of [−1, 1]. The N bits can have a value in the range of $[-2^{N-1}, 2^{N-1}-1]$. In one embodiment, N is 8, and so the N bits can have a value in the range of [−128, 127].

In step 94, the value read in step 92 can be used to identify the type of compression scheme that was used to encode the data in the compression block, and hence to determine the format of the data in the compression block. In one embodiment, if the value of the first byte is $-2^{N-1}$ (e.g., −128) then a first compression scheme is being used (e.g., the scheme described in conjunction with FIG. 8) and, according to one embodiment, the compression block is formatted like compression block 80 of FIG. 8. For example, in one embodiment, if the first byte is $-2^{N-1}$ (e.g., −128), then it is understood that the remaining 120 bits of the compression block contain directly encoded x-component and y-component data.

If the value of the first byte is not [−128], then a second compression scheme is being used (e.g., the scheme described in conjunction with FIG. 6 and the other related figures) and, according to one embodiment, the compression block is formatted like compression block 60 of FIG. 6. Therefore, it is understood that, in one embodiment, the first byte represents either P0.x or P1.x (depending on the order that those values are stored), the second byte represents the other anchor point for the x-component, the third byte represents either P0.y or P1.y (depending on the order that those values are stored), the fourth byte represents the other anchor point for the y-component, and the remaining 96 bits of the compression block contain encoded texel data.

In summary, embodiments of the present invention provide methods and systems for compressing and reconstructing data with improved precision. As a result, the quality of rendered images can be increased. The improvement in precision is achieved without actually storing an extra precision bit. In effect, the extra precision bit is a "virtual" bit that is not stored in the compression block, but whose value is derived from other information that is stored. Thus, improved precision is achieved without significantly increasing the burden on computational resources and without increasing the size or changing the structure (format) of the compression block.

Embodiments of the present invention, two component texture map compression, are thus described. While the present invention has been described in particular embodiments, it should be appreciated that the present invention should not be construed as limited by such embodiments, but rather construed according to the below claims.

What is claimed is:

1. A method of compressing and decompressing data, said method comprising:
reducing a first multi-bit value comprising N+1 bits and a second multi-bit value comprising N+1 bits to respective first and second strings of N bits each;
storing said first and second strings of N bits in a particular order relative to one another in a memory-resident compression block; and
using said particular order in which said first and second strings of N bits are stored in said compression block to derive a first single-bit value, wherein said first single-bit value has one binary value if said first multi-bit value is stored before said second multi-bit value in said compression block and otherwise said first single-bit value has the other binary value, wherein said first single-bit value is appended as the least significant bit of one of said first and second strings of N bits to reconstruct said one of said first and second strings as N+1 bits.

2. The method of claim 1 wherein said storing further comprises:
determining the relative magnitude of said first and second multi-bit values;
determining the values of the least significant bits of said first and second multi-bit values; and
using said values of said least significant bits and said relative magnitude to determine said particular order for storing said first and second strings of N bits in said compression block.

3. The method of claim 2 further comprising:
determining which of said first and second strings of N bits in said compression block has the smaller magnitude; and
appending said first single-bit value to said one of said first and second strings having said smaller magnitude.

4. The method of claim 1 wherein N+1 is 9 and wherein said first and second strings of N bits are signed values normalized to the range of [−1, 1] coded in 8 bits each, said 8 bits having a value in the range of [−127, 127].

5. The method of claim 1 further comprising:
reducing a third multi-bit value comprising N+1 bits and a fourth multi-bit value comprising N+1 bits to respective third and fourth strings of N bits each;
storing said third and fourth strings of N bits in a particular order relative to one another in said compression block; and
using the particular order in which said third and fourth strings of N bits are stored in said compression block to derive a second single-bit value that is then used in combination with one of said third and fourth strings of N bits to reconstruct said one of said third and fourth strings as N+1 bits.

6. The method of claim 1 further comprising:
accessing a block of data comprising a plurality of data values;
determining said first multi-bit value and said second multi-bit value, said first multi-bit value and said second multi-bit value bounding said data values;
calculating a range of values by interpolating between said first and second multi-bit values;
indexing said first multi-bit value, said second multi-bit value and each value in said range of values with respective bit codes;
associating each of said data values in said block of data with a bit code selected from said respective bit codes; and
storing bit codes so selected in said compression block.

7. The method of claim 1 wherein said data comprise data for a normal map used in graphics processing.

8. The method of claim 1 wherein said data comprise spherical harmonic data.

9. The method of claim 1 further comprising reducing said first and second multi-bit values to N bits by truncating their least significant bits.

10. A computer system comprising:
a processor; and
a memory unit coupled to said processor, said memory unit containing instructions that when executed implement a method for compressing and decompressing data, said method comprising:
reducing a first multi-bit value comprising N+1 bits and a second multi-bit value comprising N+1 bits to respective first and second strings of N bits each;
storing said first and second strings of N bits in a particular order relative to one another in a memory-resident compression block; and
using said particular order in which said first and second strings of N bits are stored in said compression block to derive a first single-bit value, wherein said first single-bit value has one binary value if said first multi-bit value is stored before said second multi-bit value in said compression block and otherwise said first multi-bit value has the other binary value, wherein said first multi-bit value is appended as the least significant bit of one of said first and second strings of N bits to reconstruct said one of said first and second strings as N+1 bits.

11. The computer system of claim 10 wherein said storing of said method further comprises:
determining the relative magnitude of said first and second multi-bit values;
determining the values of the least significant bits of said first and second multi-bit values;
and using said values of said least significant bits and said relative magnitude to determine said particular order for storing said first and second strings of N bits in said compression block.

12. The computer system of claim 11 wherein said method further comprises:
determining which of said first and second strings of N bits in said compression block has the smaller magnitude; and
appending said first single-bit value to said one of said first and second strings having said smaller magnitude.

13. The computer system of claim 10 wherein N+1 is 9 and wherein said first and second strings of N bits are signed values normalized to the range of [−1, 1] coded in 8 bits each, said 8 bits having a value in the range of [−127, 127].

14. The computer system of claim 10 wherein said method further comprises:
reducing a third multi-bit value comprising N+1 bits and a fourth multi-bit value comprising N+1 bits to respective third and fourth strings of N bits each;
storing said third and fourth strings of N bits in a particular order relative to one another in said compression block; and
using the particular order in which said third and fourth strings of N bits are stored in said compression block to derive a second single-bit value that is then used in combination with one of said third and fourth strings of N bits to reconstruct said one of said third and fourth strings as N+1 bits.

15. The computer system of claim 10 wherein said method further comprises:
   accessing a block of data comprising a plurality of data values;
   determining said first multi-bit value and said second multi-bit value, said first multi-bit value and said second multi-bit value bounding said data values;
   calculating a range of values by interpolating between said first and second multi-bit values;
   indexing said first multi-bit value, said second multi-bit value and each value in said range of values with respective bit codes;
   associating each of said data values in said block of data with a bit code selected from said respective bit codes; and
   storing bit codes so selected in said compression block.

16. The computer system of claim 10 wherein said data comprise data for a normal map used in graphics processing.

17. The computer system of claim 10 wherein said data comprise spherical harmonic data.

18. The computer system of claim 10 wherein said method further comprises reducing said first and second multi-bit values to N bits by truncating their least significant bits.

19. A computer-readable memory unit having computer-readable program instructions stored therein for causing a computer system to perform a method comprising:
   reducing a first multi-bit value comprising N+1 bits and a second multi-bit value comprising N+1 bits to respective first and second strings of N bits each;
   storing said first and second strings of N bits in a particular order relative to one another in a memory-resident compression block; and
   using said particular order in which said first and second strings of N bits are stored in said compression block to derive a first single-bit value, wherein said first single-bit value has one binary value if said first multi-bit value is stored before said second multi-bit value in said compression block and otherwise said first single-bit value has the other binary value, wherein said first single-bit value is appended as the least significant bit of one of said first and second strings of N bits to reconstruct said one of said first and second strings as N+1 bits.

20. The computer-readable memory unit of claim 19 wherein said computer-readable program instructions stored therein causes a computer system to perform said method wherein said storing further comprises:
   determining the relative magnitude of said first and second multi-bit values;
   determining the values of the least significant bits of said first and second multi-bit values; and
   using said values of said least significant bits and said relative magnitude to determine said particular order for storing said first and second multi-bit values in said compression block.

21. The computer-readable memory unit of claim 20 wherein said computer-readable program instructions stored therein causes a computer system to perform said method further comprising:
   determining which of said first and second strings of N bits in said compression block has the smaller magnitude; and
   appending said first single-bit value to said one of said first and second strings having said smaller magnitude.

22. The computer-readable memory unit of claim 19 wherein N+1 is 9 and wherein said first and second strings of N bits are signed values normalized to the range of [−1, 1] coded in 8 bits each, said 8 bits having a value in the range of [−127, 127].

23. The computer-readable memory unit of claim 19 wherein said computer-readable program instructions stored therein causes a computer system to perform said method further comprising:
   reducing a third multi-bit value comprising N+1 bits and a fourth multi-bit value comprising N+1 bits to respective third and fourth strings of N bits each;
   storing said third and fourth strings of N bits in a particular order relative to one another in said compression block; and
   using the particular order in which said third and fourth strings of N bits are stored in said compression block to derive a second single-bit value that is then used in combination with one of said third and fourth strings of N bits to reconstruct said one of said third and fourth strings as N+1 bits.

24. The computer-readable memory unit of claim 19 wherein said computer-readable program instructions stored therein causes a computer system to perform said method further comprising:
   accessing a block of data comprising a plurality of data values;
   determining said first multi-bit value and said second multi-bit value, said first multi-bit value and said second multi-bit value bounding said data values;
   calculating a range of values by interpolating between said first and second multi-bit values;
   indexing said first multi-bit value, said second multi-bit value and each value in said range of values with respective bit codes;
   associating each of said data values in said block of data with a bit code selected from said respective bit codes; and
   storing bit codes so selected in said compression block.

25. The computer-readable memory unit of claim 24 wherein said block of data comprise data for a normal map used in graphics processing.

26. The computer-readable memory unit of claim 24 wherein said block of data comprise spherical harmonic data.

27. The computer-readable memory unit of claim 19 wherein said computer-readable instructions stored therein causes a computer system to perform said method further comprising reducing said first and second multi-bit values to N bits by truncating their least significant bits.

28. A computer-readable memory unit having a block of compressed data stored therein for causing a functional change in the operation of a device, said block of compressed data comprising:
   a first portion and a second portion for storing a first multi-bit value and a second multi-bit value comprising N bits each, said first and second multi-bit values stored in said block of compressed data in a particular order relative to one another; and
   a first plurality of portions for storing bit codes for a first set of data values that are indexed to a first range of values that are interpolated from said first and second multi-bit values;
   wherein said particular order in which said first and second multi-bit values of N bits are stored in said block of compressed data is used to derive a first single-bit value, wherein said first single-bit value has one binary value if said first multi-bit value is stored before said second multi-bit value in said compression block and otherwise said first single-bit value has the other binary value, wherein said first single-bit value is appended as the least significant bit to one of said first and second multi-bit values of N bits to create a value comprising N+1 bits.

29. The computer-readable memory unit of claim 28 wherein said first bit single-bit value is appended to said one of said first and second multi-bit values of N bits having a smaller relative magnitude.

30. The computer-readable memory unit of claim 28 wherein if said first portion of said block of compressed data contains a value that is smaller in magnitude than a value in said second portion then said first single-bit value has a first binary value, and if said first portion of said block of compressed data contains a value that is greater in magnitude than a value in said second portion then said first single-bit value has a second binary value.

31. The computer-readable memory unit of claim 28 further comprising:
    a third portion and a fourth portion for storing a third multi-bit value and a fourth multi-bit value comprising N bits each, said third and fourth multi-bit values stored in a second particular order relative to one another; and
    a second plurality of portions for storing bit codes for a second set of data values that are indexed to a second range of values that are interpolated from said third and fourth multi-bit values;
    wherein said second particular order in which said third and fourth multi-bit values of N bits are stored in said block of compressed data is used to derive a second single-bit value that is then appended to one of said third and fourth multi-bit values of N bits to create a value comprising N+1 bits.

32. The computer-readable memory unit of claim 28 wherein N is 8 and wherein said first and second multi-bit values of N bits are signed values normalized to the range of [−1, 1], said 8 bits having a value in the range of [−127, 127].

33. The computer-readable memory unit of claim 28 wherein said block of compressed data comprise data for a normal map used in graphics processing.

34. The computer-readable memory unit of claim 28 wherein said block of compressed data comprise spherical harmonic data.

35. A method of compressing and decompressing data, said method comprising:
    reading a first value in a compression block, wherein said first value is a signed value comprising N bits and normalized to the range of [−1, 1], said N bits having a value substantially in the range of $[-2^{N-1}, 2^{N-1}-1]$; and
    using said first value to identify a type of compression used to encode data in said compression block, wherein if said first value is $-2^{N-1}$ then a first type of compression is used and otherwise a second type of compression is used;
    wherein according to said first type of compression said compression block comprises:
        a portion for storing said first value; and
        a plurality of portions for storing compressed data values; and
    wherein according to said second type of compression said compression block comprises:
        a first portion for storing said first value and a second portion for storing a second value, said first and second values stored in said compression block in a particular first order relative to one another, wherein said particular first order is used to derive a first bit value that is then appended to one of said first and second values to create a value comprising N+1 bits; and
        a first plurality of portions for storing bit codes for a first set of data values that are indexed to a first range of values that are interpolated from said first and second values.

36. The method of claim 35 wherein according to said second type of compression said compression block further comprises:
    a third portion for storing a third value and a fourth portion for storing a fourth value, said third and fourth values stored in said compression block in a particular second order relative to one another, wherein said particular second order is used to derive a second bit value that is then appended to one of said third and fourth values to create a value comprising N+1 bits;
    and a second plurality of portions for storing bit codes for a second set of data values that are indexed to a second range of values that are interpolated from said third and fourth values.

37. The method of claim 35 wherein N is 8.

* * * * *

UNITED STATES PATENT AND TRADEMARK OFFICE
CERTIFICATE OF CORRECTION

PATENT NO.      : 7,961,195 B1
APPLICATION NO. : 10/990900
DATED           : June 14, 2011
INVENTOR(S)     : Rogers et al.

Page 1 of 1

It is certified that error appears in the above-identified patent and that said Letters Patent is hereby corrected as shown below:

1. In column 12, line 31, "multi-bit" should be changed to --single-bit--.

2. In column 12, line 32, "multi-bit" should be changed to --single-bit--.

Signed and Sealed this

Thirteenth Day of September, 2011

David J. Kappos
*Director of the United States Patent and Trademark Office*